INVENTORS
EDWARD J. POITRAS
LYMAN H. WALBRIDGE

ATTORNEYS

INVENTORS
EDWARD J. POITRAS
LYMAN H. WALBRIDGE
BY, Kenway, Jenney & Hildreth
ATTORNEYS

United States Patent Office 3,496,338
Patented Feb. 17, 1970

3,496,338
PULSED CONTROLLERS
Edward J. Poitras, Holliston, and Lyman H. Walbridge, Ashland, Mass., assignors to Fenwal Incorporated, Ashland, Mass., a corporation of Massachusetts
Filed May 19, 1967, Ser. No. 639,698
Int. Cl. H05b 1/02
U.S. Cl. 219—494                          10 Claims

ABSTRACT OF THE DISCLOSURE

A pulsed controller for controlling variables adapted to be measured by an electrically excited transducer of the type whose output signal may be affected by the exciting current. The controllers described are particularly useful for controlling the temperature of a heated space. For that application, we provide a conventional resistance bridge, one arm of which is formed by a temperature sensing resistor. The bridge is supplied with pulses of electrical energy of substantial voltage amplitude but short time duration from a pulse source. The bridge output signal is utilized to control the supply of thermal energy to the space whose temperature is to be controlled. The use of pulses to energize the bridge minimizes self-heating of the elements of the bridge that would cause a variation of the "set-point" of the controller, and yet provides large signals for the thermal energy control device.

BACKGROUND OF THE INVENTION

Field of the invention

Temperature controllers using resistance bridge circuits, one arm of the bridge including a resistance which is responsive to temperature, are well known. In general, in the past, these bridges have been supplied from a steady source of electrical energy, sometimes D.C., sometimes A.C. In any event, the energy has been supplied at a substantially constant rate at all times. Obviously, the energy supplied to the bridge will cause self-heating of the elements of the bridge and in particular will cause the temperature sensing resistor, whose resistance is supposed to measure the temperature to be controlled, to itself increase in temperature. The heating of the temperature sensitive resistor changes the "set-point" of the controller and causes the controller to remove heating energy from the controlled space sooner than it otherwise would.

Description of prior art

To overcome this problem in the past, resistive bridge temperature controllers have been designed to be supplied with relatively small amounts of electrical energy, i.e., they usually are of fairly high impedance and the voltage supplied is quite small so that bridge current is reduced. This arrangement reduces the self-heating effect, so that the change in signal appearing across the bridge output terminals is a function of the variations in temperature of the space to be controlled rather than from self-heating of the bridge temperature-sensing element. Because the energy supplied to the bridge is small in these prior constructions, the bridge output signal is also at a relatively low energy level. This means that the bridge output signal is not only inherently limited in signal-to-noise ratio, but must be substantially amplified before it can be used to control the thermal energy source which is supplying the energy to the temperature-controlled space. The amplifying apparatus required in conventional controllers is a substantial portion of the total cost of the controller.

SUMMARY OF THE INVENTION

In controllers of our invention, we avoid these problems by supplying the bridge with pulses of relatively high voltage amplitude but very short time duration. Thus, while the average power supplied to the bridge over a given time period is low, the voltage amplitude of the signal from the bridge is high. As long as the bridge supplies a steady train of control pulses indicating that thermal energy should be supplied to the load, the energy source controller is operated to supply continuous energy. Thus, the information associated with each very short time control pulse is effectively "stored" until the time of the next subsequent control pulse. The result of this arrangement is that we can provide a low cost temperature controller, two embodiments of which will be described below.

Accordingly, a principal object of our invention is to provide a pulsed controller. Another object of our invention is to provide a temperature controller of the type described which is of relatively low cost. A further object of our invention is to provide a temperature controller of the type described which eliminates the need for large amounts of amplification of the bridge output signal before the signal may be used to control the thermal energy source. Other and further objects of our invention will in part be obvious and will in part appear hereinafter.

Our invention accordingly comprises the features of construction, combinations of elements and arrangements of parts which will be exemplified in the constructions hereinafter set forth. The scope of the invention will be indicated in the claims.

BRIEF DESCRIPTION OF THE DRAWINGS

For a fuller understanding of the nature and objects of our invention, the reader should refer to the following detailed description taken in connection with the accompanying drawings in which.

DESCRIPTION OF THE PREFERRED EMBODIMENTS

Figure 1:
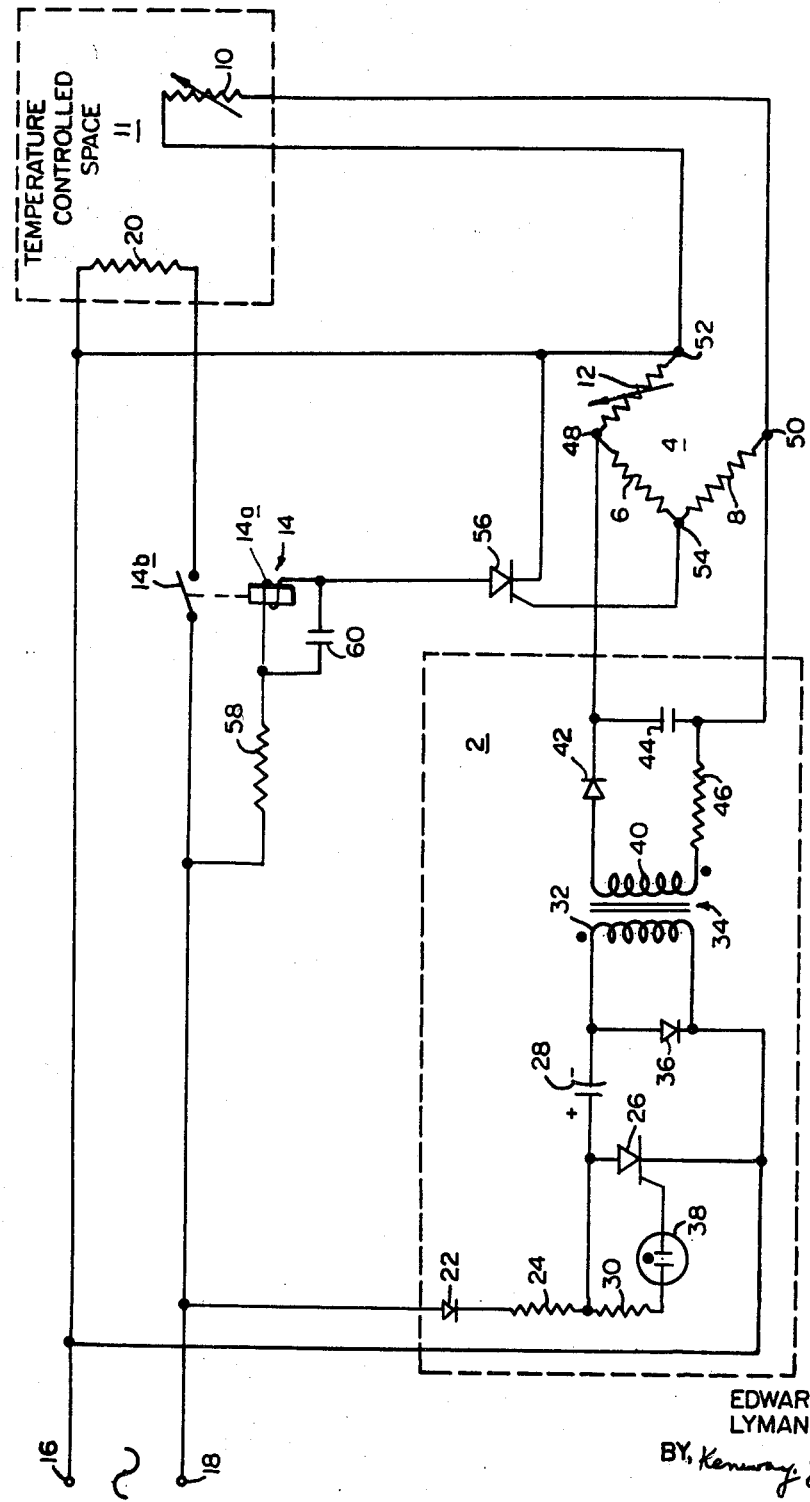
FIG. 1 illustrates a pulsed-bridge temperature controller in accordance with a first embodiment of our invention.

In the pulsed-bridge temperature controller illustrated in FIG. 1, we provide a pulse generator circuit 2, a resistor bridge generally indicated at 4, which includes the fixed resistors 6 and 8, a temperature sensitive resistor 10, and a set-point adjusting resistor 12. As shown, the resistor 10 may be a conventional resistance bulb, which has a positive temperature coefficient. Alternatively, it may be a thermistor having a negative temperature coefficient, in which case the output leads of the bridge would be reversed, or the positions of the resistors 10 and 12 would be exchanged as compared to what is shown in FIG. 1. The selection of the particular thermally sensitive resistor is made on the basis of desired sensitivity and economic considerations.

The signal from the bridge is used in a manner to be described below to control a relay generally indicated at 14. The relay 14 has a winding 14a, which, when energized, closes a contact 14b to supply energy from a source of A.C. power which is connected to the terminals 16 and 18 to the electrical heater element shown at 20. Both the temperature sensitive resistor 10 and the heater 20 are located within the enclosed region or space 11 whose temperature is to be controlled, this space being indicated by a broken line.

The pulse circuit generally indicated at 2 includes a rectifying diode 22 connected through a resistor 24 to the anode of a silicon controlled rectifier 26, to one terminal of the capacitor 28, and to one terminal of a resistor 30. The other terminal of the capacitor 28 is connected to the input terminal 16 through the primary winding 32 of a transformer generally indicated at 34.

As shown, a diode 36 is connected in parallel with the primary winding 32 of the transformer 34.

The cathode of the silicon controlled rectifier 26 is connected directly to the input terminal 16. The gate terminal of the silicon controlled rectifier 26 is connected to the anode of the controller rectifier 26 through a neon bulb 38 and the resistor 30. It will be apparent that with this arrangement, when the terminal 18 goes positive with respect to the terminal 16, the capacitor 28 will be charged through the diode 22, the resistor 24 and the primary winding 32 in parallel with the diode 36. When the voltage across the capacitor 28 is sufficiently high, the neon bulb 38 will conduct, gating the controlled rectifier 26 into conduction and discharging the capacitor 28 through the primary winding 32. The amount of current supplied to the primary winding 32 is determined by the size of the capacitor 28. The point or time in the positive half-cycle at which the neon bulb 38 goes into conduction is determined by the time constant established by the resistor 24 and the capacitor 28. The resistor 30 limits the current to the controlled rectifier 26.

The transformer 34 is provided with a secondary winding 40 poled relative to the primary winding 32 in a manner indicated by the conventional dots. The secondary winding 40 is connected in series with a diode 42, a capacitor 44 and a resistor 46. The diode 42 permits current flow in the secondary winding 40 in only one direction. The resistor 46 and the capacitor 44 are selected to increase the rise time of the pulse appearing across the transformer secondary winding 40 when current flows through the primary winding 32, without seriously affecting the amplitude of the pulse. It will be apparent that during each positive half-cycle the capacitor 28 will be charged until the neon bulb 38 breaks down as described above. The capacitor 28 will then be discharged through the controlled rectifier 26 and the primary winding 32. A unidirectional pulse then appears across the capacitor 44 and is applied to the terminals 48 and 50 of the bridge 4. The diode 36 absorbs and limits any fly-back voltages that might otherwise produce voltages in the wrong direction in the transformer 34, so that the result will be one steep positive pulse of voltage on terminal 48 with respect to terminal 50 during each positive half-cycle of the source voltage. It is necessary to inhibit pulses of the opposite polarity, as such pulses would result in a bridge output of the wrong polarity, and might gate the controlled rectifier "off" before the end of the positive half-cycle. For the purposes of our invention, the pulse should be relatively steep and of short duration in relation to a half cycle of the energizing A.C.; typically, pulses of about 100 microseconds in duration may be employed although the invention is useful with pulses of 10 milliseconds or longer.

The controlled rectifier 26 is extinguished following the discharge of the capacitor 28 when the voltage on terminal 18 goes negative with respect to terminal 16. No further action takes place in the pulse generator 2 during the negative half-cycles of the applied line voltage.

The bridge circuit operates in accordance with known principles. Thus, if the bridge is unbalanced, and depending upon the relative value of the resistor 12 and the temperature sensitive resistor 10, a pulse of voltage will appear at the terminals 52 and 54 of the bridge. A pulse appears, for example, if the temperature in the controlled space is below the temperature desired as determined by the setting of variable resistor 12.

Since the pulse is applied to the bridge for a very limited duration, the output signal appearing across terminals 52 and 54 can be relatively large for a relatively small unbalance of the bridge without causing heating of the bridge that would distort its response.

The output terminals 52 and 54 of the bridge 4 are connected to the cathode and gate terminal, respectively, of a silicon controlled rectifier 56. As is understood, the silicon controlled rectifier (SCR) is a semiconductor current switching device which can be energized by a pulse of proper polarity applied to its trigger circuit, i.e. between the gate and cathode. The terminal 52 is also connected to the input terminal 16. The anode of the controlled rectifier 56 is connected through the winding 14a of the relay 14 and the current-limiting resistor 58 to the input terminal 18. A storage capacitor 60 is connected across the winding 14a to integrate the voltage applied to the relay winding and to aid in holding the relay energized between current pulses. The resistor 58 protects the controlled rectifier 56 against excessive currents by limiting the charging rate of the capacitor 60. The relay and capacitor thus serve as a "register" to store the information that a current pulse of the proper polarity has been produced until the time when another pulse will be produced if the bridge is still unbalanced.

The operation of the apparatus of FIG. 1 will be apparent from the above description. Each time the input terminal 18 goes positive with respect to the terminal 16, the pulse generator 2 produces an energizing pulse of voltage across the input terminals 48 and 50 of the bridge 4. If the bridge is unbalanced in a sense caused by the temperature in the temperature controlled space 11 being below the set-point established by the resistor 12, the output pulse between the terminals 52 and 54 will be of the correct polarity to gate the controlled rectifier 56 into conduction. As the anode of the controlled rectifier 56 is positive with respect to the cathode when the bridge pulses are produced, the controlled rectifier will conduct and allow energizing current to flow through the winding 14a of the relay 14. The relay 14 will close its contact 14b, and this contact will remain closed as previously stated until the temperature in the controlled space rises above the set-point. At that time, the bridge output signal will go negative, and the controlled rectifier will be held at its non-conducting state by the negative bridge output pulse.

It will be apparent from the description so far that we have provided a simple low-cost temperature controller by supplying pulses of substantial magnitude but short duration to a bridge circuit and utilizing the pulse output from the bridge to operate a control device to control the power to the space where temperature is controlled. In the circuit of FIG. 1, a bridge energizing pulse is produced once each cycle of the source voltage, permitting very rapid system response.

For many purposes, such a rapid response is not needed, because the thermal time constants of the controlled space and of the thermal source 20 may be relatively large. Under these circumstances, the self-heating of the temperature sensing resistor may be even further minimized by pulsing the bridge less frequently than once each cycle of the supply voltage.

Figure 2:
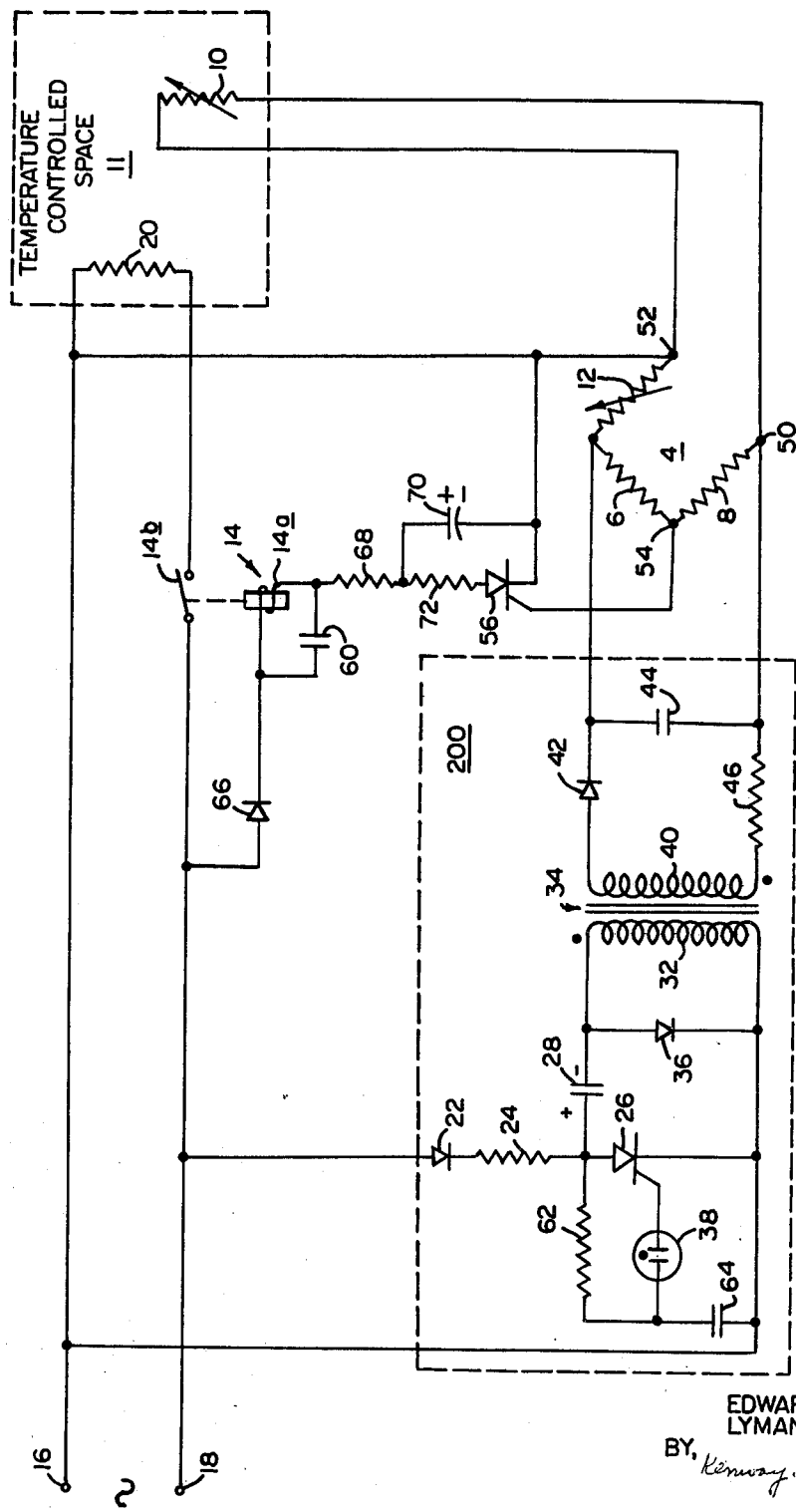
FIG. 2 illustrates a controller made according to a second embodiment of our invention.

The circuit of FIG. 2 takes advantage of the fact that relatively long time constants are satisfactory for many temperature control problems to attain more efficient operation.

The controller of FIG. 2 is substantially the same as the controller of FIG. 1, in many respects, and corresponding parts have been given corresponding reference numerals. The essential difference between the controller of FIG. 1 and that of FIG. 2 is that elements have been added to the FIG. 2 controller to make it possible to pulse the temperature sensing bridge at intervals that are long with respect to the period of the line voltage.

In FIG. 2 the terminals 16 and 18 are adapted to be connected to a suitable source of alternating voltage as in the circuit shown. The heating element 20 is connected in series with the terminals 16 and 18 and the normally open contact 14b of the relay 14. The energizing circuit for the relay 14 includes a diode 66, the winding 14a of the relay in parallel with an integrating capacitor 60, a resistor 68, the capacitor 70 in parallel with a resistor 72 in the anode to cathode path of the silicon controlled rectifier 56, all of these elements being connected, as illustrated, between the terminals 16 and 18. The cathode and the gate of the controlled rectifier 56 are connected across the terminals 52 and 54 of the bridge 4, as in the apparatus of FIG. 1. The bridge 4 in FIG. 4 is substantially identical to that shown in FIG. 1. The input terminals 48 and 50 of the bridge 4 are connected to the output terminals of a pulse generator 200.

The pulse generator 200 is similar in many respects to the pulse generator of FIG. 1 and includes a transformer 34 having a primary winding 32 and a secondary winding 40. The secondary winding 40 is connected in series with the diode 42, the capacitor 44 and resistor 46 in the same manner and for the same purposes as in the pulse generator 2 of FIG. 1. The primary winding 32 of the transformer 34 has a diode 36 connected across it. The primary winding 32 is also connected in series with a storage capacitor 28 and the anode to cathode path of a silicon controlled rectifier 26. The anode of the controlled rectifier 26 is connected through a resistor 24 and a diode 22 to the input terminal 18. The cathode of the controlled rectifier 26 is connected to the terminal 16. A gate control circuit for the controlled rectifier 26 is connected from the anode of the controlled rectifier through a resistor 62 and a storage capacitor 64 to the cathode of the controlled rectifier 26. The junction of the resistor 62 and the capacitor 64 is connected through a neon bulb 38 to the gate of the controlled rectifier 26.

The operation of the apparatus of FIG. 2 is as follows. Each time the input terminal 18 goes positive with respect to the input terminal 16, the capacitor 28 is charged through the diode 22, the resistor 24 and the diode 36, as in the apparatus of FIG. 1. However, the breakdown of the bulb 38 is made independent of the line frequency by the resistor 62 and the capacitor 64. The time constant of these elements is selected so that the voltage across the neon bulb 38 will not be sufficiently great to cause breakdown of the bulb until the capacitor 64 has been charged over a substantial number of cycles. For example, the time constant could be selected to be several seconds. When the bulb 38 does break down, during some half-cycle in which the terminal 18 is positive, the controlled rectifier 26 will be gated into conduction and a pulse will be produced by the transformer 34 and applied to the bridge 4. Then, if the bridge is unbalanced with the temperature below the set-point, a positive output signal will be produced at the terminal 54 with respect to the terminal 52, and the controlled rectifier 56 will be gated into conduction. Prior to conduction of the controlled rectifier the capacitor 70 will have been charged through the diode 66, the relay winding 14a, and the resistor 68. The time constant of these elements is selected such that the capacitor 70 will be charged, and hence permit energization of the relay 14, in a period equal to or less than the pulse period which is established by the resistor 62 and the capacitor 64. With the capacitor 70 charged, and the controlled rectifier 56 not conducting, the relay 14 will be deenergized. However, when the controlled rectifier 56 is gated on by an appropriate signal from the bridge 4, the capacitor 70 will be discharged through the resistor 72 and the controlled rectifier 56. The resistor 72 is selected to protect the controlled rectifier 56 against excessive currents during discharge of the capacitor 70. The time constant of the combination of the resistor 72 and the capacitor 70 can be relatively small.

Once the capacitor 70 has been discharged, each positive half-cycle of the terminal 18 with respect to the terminal 16 will cause a pulse of current to flow through the rectifier 66, through the winding of the relay 14a in parallel with the capacitor 60, and through the resistor 68 to charge the capacitor 70. The relay 14 will therefore remain energized, and continue to supply current to the heating element over its contact 14b, during the interval before the next bridge signal pulse can be produced. It will be apparent that by this construction a control signal of very small average energy and relatively high signal-to-noise ratio can be employed with little expense.

In the circuit of FIG. 2, the pulse supplied by the secondary winding 40 to the bridge 4 is of a polarity such that the terminal 48 of the bridge is positive with respect to the terminal 50 while the pulse is applied. Under this condition, the resistance element 10 should be an element which has a positive temperature coefficient of resistance, i.e., as the temperature increases the resistance of the temperature sensitive resistor should increase. Metallic resistance elements, for example, generally have this characteristic. Thus, at low temperatures, the resistance element 10 will be at a fairly low value of resistance, the terminal 54 will be positive with respect to the terminal 52 and the controlled rectifier 56 will conduct, causing the relay 14 to be energized in the manner described above and thus supplying energy to the temperature controlled space to increase its temperature. As the temperature increases, the resistance of the element 10 will increase and the amplitude of the pulse appearing at the terminal 54 with respect to the terminal 52 will diminish in amplitude. When the pulse amplitude has dropped sufficiently, the controlled rectifier 56 will no longer be gated into conduction when the bridge is pulsed and, when the charge on the capacitor 70 is restored, the relay 14 will drop out, removing power from the heater 20.

Of course, while we have described the circuit of FIG. 2 with respect to resistance elements having a positive temperature coefficient in the embodiments shown in FIGS. 1 and 2, it will be obvious to those having skill in this art that negative temperature coefficient devices such as thermistors might be used by interchanging the connections between the rectifier and the bridge, interchanging the positions of resistors 10 and 12, etc.

Further, while we have described our invention with respect to a temperature controller which utilizes a source of electric power to supply energy to the temperature controlled space, the same circuit may be used to provide pulse signals to control a supply of gas to a gas burner or oil to an oil burner in a similar fashion. The controller of our invention is particularly useful with gas and oil burners which use electric spark ignition and control systems. However, the apparatus of our invention is also useful for the control of variables other than temperature, such as pressure, mass flow rate, voltage, and the like. Many of the advantages of our invention may be attained without the use of a bridge circuit; in its broader aspects, our invention is applicable to controllers including condition sensing transducers of any conventional electrically excited variety that are subject to output signal distortion by the exciting current applied.

It will thus be seen that we have provided a low cost controller utilizing a pulsed bridge. By the use of pulses the self-heating of the temperature-sensitive resistor used in connection with the bridge circuit is minimized and yet a substantial voltage output signal is provided whose amplitude can be used directly to control pulse responsive control means to control the supply of energy to the space whose temperature is to be controlled.

It will thus be seen that the objects set forth above, among those made apparent from the preceding description, are efficiently attained and, since certain changes may be made in the above constructions without departing from the scope of the invention, it is intended that all matter contained in the above description as shown in the accompanying drawings shall be interpreted as illustrative and not in a limiting sense.

It is also to be understood that the following claims are intended to cover all of the generic and specific features of the invention herein described, and all statements of the scope of the invention, which, as a matter of language, might be said to fall therebetween.

Having described our invention, what we claim as new and desire to secure by Letters Patent is:

1. A temperature controller, comprising:
an electrically energized element operable when energized to supply heat to a space whose temperature is to be controlled;
a switch;
a pair of terminals adapted to be connected to a source of alternating current and connected to said element in series with said switch;
temperature transducing means mounted in position to respond to the temperature in the space to be controlled and adapted to produce an output signal, when excited by an applied electrical reference signal, determined in magnitude both by the magnitude of the reference signal and the extent of the departure of the temperature from a predetermined temperature, said output signals having a sense dependent on the sense of the departure of the temperature from said predetermined temperature;
pulse generating means connected to said terminals and to said transducing means and responsive to alternating voltage applied to said terminals to periodically apply electrical reference signal pulses for exciting said transducing means, said pulses being relatively short in relation to a half cycle of said alternating current;
temporary storage means controlled by said transducing means and actuated from a first state to a second state for a predetermined time at least equal to the period of said pulse generating means by output signals from said transducing means of the sense indicating that the temperature in the controlled space is below said predetermined temperature; and
means controlled by said storage means in the second state for closing said switch thereby to energize said heat supplying element.

2. A control circuit, comprising
(1) a pair of terminals adapted to be connected to a source of alternating voltage;
(2) a load impedance;
(3) a relay having a winding and a pair of normally open contacts closed when the relay winding is energized;
(4) said contacts being connected in series with said terminals and said load impedance;
(5) a series circuit connected between said terminals, said circuit comprising
(6) rectifying means;
(7) a capacitor; and
(8) said winding connected in series;
(9) a switch; and
(10) a resistor connected in series across said capacitor; and
(11) means responsive to a condition indicative of a need to energize said load impedance for periodically closing said switch when said condition is present to discharge said capacitor through said resistor and allow current to flow through said winding to close said contacts.

3. The apparatus of claim 2, further comprising
(1) a second resistor connected in series with said capacitor; and
(2) a second capacitor connected across said winding.

4. Apparatus for selectively energizing a heater thereby to maintain the temperature in a predetermined region substantially at a preselected level, said apparatus comprising:
A.C. energizable power control means for controlling energization of said heater, said control means including a triggerable semiconductor current switching device which can be energized by means of a pulse applied to a trigger circuit thereof and which then remains energized for the rest of an A.C. half cycle within which the device is triggered, energization of said device being operative to effect energization of said heater;
an impedance bridge having input terminals and output terminals and including at least one element having an impedance characteristic which is responsive to the temperature in said region;
means for repetitively generating pulses, said pulses being of relatively short duration in relation to an A.C. half cycle;
means for applying the pulses so generated to the input terminals of said bridge; and
means connecting the output terminals of said bridge to the trigger circuit of said current switching device whereby said device is selectively triggered in response to the temperature in said region thereby to maintain said temperature at a level which is preselected by the characteristics of said bridge.

5. Apparatus for selectively energizing a heater thereby to maintain the temperature in a predetermined region substantially at a preselected level, said apparatus comprising:
A.C. energizable power control means for controlling energization of said heater, said control means including a triggerable semiconductor current switching device which can be energized by means of a pulse of predetermined polarity applied to a trigger circuit thereof and which then remains energized for the rest of an A.C. half cycle within which the device is triggered, energization of said device being operative to effect energization of said heater;
an impedance bridge having input terminals and output terminals and including at least one element having an impedance characteristic which is responsive to the temperature in said region;
means for generating a pulse at a preselected time within each A.C. cycle, said pulses being of relatively short duration in relation to an A.C. half cycle;
means for applying the pulses so generated to the input terminals of said bridge thereby to obtain at said output terminals a pulse control signal having an amplitude and polarity which vary as a function of the temperature in said region; and
means connecting the output terminals of said bridge to the trigger circuit of said current switching device whereby said device is selectively triggered in response to the temperature in said region thereby to maintain said temperature at a level which is preselected by the characteristics of said bridge.

6. Apparatus as set forth in claim 5 wherein said switching device comprises an SCR.

7. Apparatus as set forth in claim 6 wherein said power control means includes a relay which is selectively energized by said SCR.

8. Apparatus as set forth in claim 7 wherein said power control means includes a capacitor for maintaining the energization of said relay between repetitive periods of energization of said SCR.

9. Apparatus as set forth in claim 5 wherein said means for generating pulses comprises a voltage breakdown device which fires at a preselected time within each A.C. cycle.

10. Apparatus as set forth in claim 9 wherein said means for generating pulses comprises an SCR which is triggered by the firing of said breakdown device.

References Cited

UNITED STATES PATENTS

| | | | |
|---|---|---|---|
| 3,098,920 | 7/1963 | Bray | 219—499 |
| 3,136,877 | 6/1964 | Heller | 317—42 |

BERNARD A. GILHEANY, Primary Examiner

F. E. BELL, Assistant Examiner

U.S. Cl. X.R.

219—501